United States Patent
Brennan et al.

(10) Patent No.: US 12,018,515 B2
(45) Date of Patent: Jun. 25, 2024

(54) EXIT DEVICE FOR HIGH WIND ENVIRONMENTS

(71) Applicant: Hanchett Entry Systems, Inc., Phoenix, AZ (US)

(72) Inventors: John Austin Brennan, Phoenix, AZ (US); Daniel Patrick Van Dusen, Mesa, AZ (US); Neil Brendan O'Leary, Tempe, AZ (US); Richard Samuel Kreidel, Polson, MT (US)

(73) Assignee: Hanchett Entry Systems, Inc., Phoenix, AZ (US)

( * ) Notice: Subject to any disclaimer, the term of this patent is extended or adjusted under 35 U.S.C. 154(b) by 0 days.

(21) Appl. No.: 18/295,326

(22) Filed: Apr. 4, 2023

(65) Prior Publication Data

US 2023/0235598 A1 Jul. 27, 2023

Related U.S. Application Data

(62) Division of application No. 16/710,861, filed on Dec. 11, 2019, now Pat. No. 11,619,071.

(60) Provisional application No. 62/777,854, filed on Dec. 11, 2018.

(51) Int. Cl.
*E05B 65/10* (2006.01)
*E05C 3/16* (2006.01)

(52) U.S. Cl.
CPC .......... *E05B 65/1053* (2013.01); *E05C 3/162* (2013.01)

(58) Field of Classification Search
CPC .............................. E05B 65/1053; E05C 3/162
See application file for complete search history.

(56) References Cited

U.S. PATENT DOCUMENTS

| | | | |
|---|---|---|---|
| 2,261,652 A | 11/1941 | La Mere | |
| 9,816,291 B2 * | 11/2017 | Wong | E05B 43/005 |
| 9,939,054 B2 * | 4/2018 | Stephenson | E05B 65/1053 |
| 10,017,964 B2 * | 7/2018 | Corwin, Jr. | E05B 65/1053 |
| 10,030,411 B2 | 7/2018 | Coleman et al. | |
| 10,072,444 B2 * | 9/2018 | Lehner, Jr. | E05F 11/54 |
| 10,844,637 B2 | 11/2020 | Yalamati et al. | |
| 2010/0026012 A1 | 2/2010 | Lin | |
| 2010/0045053 A1 | 2/2010 | Dye et al. | |

(Continued)

FOREIGN PATENT DOCUMENTS

WO 2019032673 2/2019

*Primary Examiner* — Mark A Williams
(74) *Attorney, Agent, or Firm* — Woods Oviatt Gilman LLP; Dennis B. Danella, Esq.

(57) ABSTRACT

A door latch system includes an exit device having a housing mounted to an unsecured side of a door. A latch assembly is mounted in the housing and includes a latch for releasably securing the door in a door frame. An actuating assembly includes a driving member. A push bar is configured to be received within the housing. Relative movement between the push bar and base plate so as to reduce the distance between the push bar and base plate moves the driving member and latch to release the door from the door frame. A dashpot is connected to the driving member and configured to allow movement of the driving member when the push bar is manually depressed but to resist movement of the driving member when a secure side of the door experiences a high velocity impact. A method of resisting unwanted unlatching of the latch is also disclosed.

1 Claim, 4 Drawing Sheets

(56) References Cited

U.S. PATENT DOCUMENTS

| | | | |
|---|---|---|---|
| 2012/0032455 A1* | 2/2012 | Lin | E05B 17/0041 |
| | | | 292/92 |
| 2015/0184426 A1* | 7/2015 | Arlinghaus | E05B 65/108 |
| | | | 292/138 |
| 2016/0115719 A1* | 4/2016 | Coleman | E05B 17/2084 |
| | | | 292/195 |
| 2017/0292294 A1* | 10/2017 | Brennan | E05B 65/108 |
| 2018/0128015 A1 | 5/2018 | Shah et al. | |
| 2018/0148955 A1* | 5/2018 | Yalamati | E05B 65/1053 |
| 2019/0048618 A1* | 2/2019 | McKibben | E05B 65/1006 |
| 2019/0376331 A1* | 12/2019 | McKibben | E05F 1/1261 |
| 2020/0011100 A1 | 1/2020 | Mani et al. | |
| 2020/0181949 A1* | 6/2020 | Brennan | E05C 3/162 |
| 2021/0148141 A1 | 5/2021 | Yalamati et al. | |

* cited by examiner

EXIT DEVICE FOR HIGH WIND ENVIRONMENTS

RELATIONSHIP TO OTHER APPLICATIONS AND PATENTS

The present application is a divisional of U.S. patent application Ser. No. 16/710,861 filed on Dec. 11, 2019, now U.S. Pat. No. 11,619,071, which claims the benefit of U.S. Provisional Patent Application No. 62/777,854, filed Dec. 11, 2018, which are hereby incorporated by reference in their entirety.

TECHNICAL FIELD

The present invention relates to a door latch system for latching a hinged door into a frame; and more particularly, to a door latch system for use with a push bar style exit device; and still more particularly to a door latch system for use with a push bar style exit device used with a door that may be subjected to high winds and flying debris, such as that experienced during a hurricane or tornado. The door latch system includes features to prevent unwanted actuation of the exit device when the door is struck by high velocity, wind-driven debris.

BACKGROUND OF THE INVENTION

Existing door latch systems, such as exit devices, incorporate a locking element, such as a latch, engageable with a mating strike. In unlocking, the latch of the exit device is required to rotate or retract out of the way of the mating strike to reach a state of being unlocked. The latch is typically mounted in a door and the strike in a door frame.

With reference to FIG. 1, an exit device 100 for an exterior door 102 may typically employ a push bar 104 to enable unlocking of the latch system 106 so as to enable door opening from the unsecured, interior side 108 of the door 102. Push bars allow users to open the door without necessarily requiring the use of their hands. Rather, the user's body can be used to push against the push bar until the latch is retracted from the strike.

Devices sold under UL specifications must meet an Emergency Operation Test standard whereby a horizontal force of 15 pounds or less applied to the push bar is required to enable operation of latch system 106. In order to return the push bar to its extended position after an opening force is applied to the push bar, manufacturers must provide for an internal biasing mechanism, such as a spring. Thus, the internal biasing mechanism must be carefully matched to the device so as to return the push bar to its extended position after force is removed from the push bar, yet still meet the UL specifications.

While exit devices designed to meet the UL specifications may adequately secure the door in a closed position during typical conditions, it has been found that these exit devices may fail when the door is subjected to sudden, high velocity impacts, such as when secure side 110 of door 102 is struck by windborne debris during a hurricane or tornado. Debris, such as tree limbs, construction materials, etc., may become airborne in high wind conditions. Hurricanes having wind speeds over 140 miles per hour (mph) and tornados with wind speeds exceeding 250 mph may create flying projectiles having velocities in excess of 100 mph that can strike surfaces (such as doors) with extremely high instantaneous impact energies.

To prevent breaches in building materials such as doors and door latches, numerous agencies have developed building code standards. One such agency is ASTM International (West Conshohocken, PA 19428) which has published standards designated E1886 and related E1996. These standards create test methods to simulate and rate performance when a secured door is impacted by projectiles and windborne debris during a natural disaster.

When a secured door having a push bar latching mechanism is impacted in accordance with the ASTM test, the dynamics of a high energy impact may cause the body or base plate of the push bar latching mechanism to instantaneously and momentarily move closer to the push bar itself. This relative movement between the base plate and push bar, if great enough, may cause the push bar to release the latch and therefore allow the door to swing free from its secured position. Thus, while the door material itself may pass the test, the latching mechanism of doors equipped with push bar exit devices may be breached under test conditions.

Thus, what is needed in the art is a door latch system and exit device which can withstand projectile impacts without unwanted actuation of the exit device. It is a principal object of the present invention to address this, as well as other, needs.

SUMMARY OF THE INVENTION

Briefly described, a door latch system includes a latch housing mounted to an unsecured side of a door. A latch assembly is mounted in the housing and includes a latch movable between a latched position and an unlatched position for releasably securing the door in a door frame. An actuating assembly includes a driving member movable between a driving member latched position and a driving member unlatched position. The actuating assembly also includes at least one actuating member acting upon the driving member. The actuating member may include, for example, first and second legs pivotally coupled to one another. The first leg is connected to a base plate of the latch housing and the second leg is slidably coupled to the driving member. A push bar is configured to be received within the housing at a movable distance from the base plate. Movement of the push bar relative to the base plate so as to reduce the distance between the push bar and base plate causes the driving member to translate in a direction perpendicular to the movement between the push bar and base plate thereby moving the latch toward its unlatched position. A dashpot is mounted to the latch housing and may be operatively connected to the driving member. The dashpot is configured to allow relatively free movement of the driving member when the distance between the push bar and base plate is reduced under normal operating conditions, and to oppose instantaneous movement of the driving member when a secure side of the door experiences a high velocity impact to reduce the distance between the push bar and base plate. Thus, the latch may remain latched when a high velocity impact against the door is sustained.

In accordance with an aspect of the present invention, the dashpot may be a pneumatic damper or a hydraulic damper.

The dashpot in accordance with the invention includes a dashpot body and a dashpot rod. The dashpot rod is positioned to react against movement of the actuating assembly such as the driving member and is configured to freely translate within the dashpot body when the push bar is manually depressed but to resist translation within the dashpot body when the secure side of the door experiences the instantaneous high velocity impact.

In accordance with a further aspect of the invention, a method of resisting unwanted unlatching of a latch of an exit device under high wind conditions is disclosed. The method includes the steps of:
a. determining the resistive force needed at the driving member to oppose unwanted movement of the push bar toward the housing when the door is struck on a secured side with a projectile at a high velocity simulating high wind conditions wherein the secured side is opposite said unsecured side of said door and wherein the unwanted movement of the push bar is a distance of movement sufficient to move the latch to the unlatched position;
b. selecting a dashpot configured so that, when positioned within the exit device so as to oppose a resulting movement of the driving member, the selected dashpot:
  i. resists the resulting movement with a first opposing force when the door is struck on said secured side with the projectile at a high velocity simulating high wind conditions; and
  ii. opposes movement of the driving member with a second opposing force when the push bar is operated under normal operating conditions, wherein the second opposing force is lesser than the first opposing force and the second opposing force is insufficient to prevent the latch from moving to the unlatched position; and
c. positioning the dashpot within the exit device so as to oppose the resulting movement of said driving member.

Numerous applications, some of which are exemplarily described below, may be implemented using the present invention.

BRIEF DESCRIPTION OF THE DRAWINGS

The present invention will now be described, by way of example, with reference to the accompanying drawings, in which.

Figure 1:
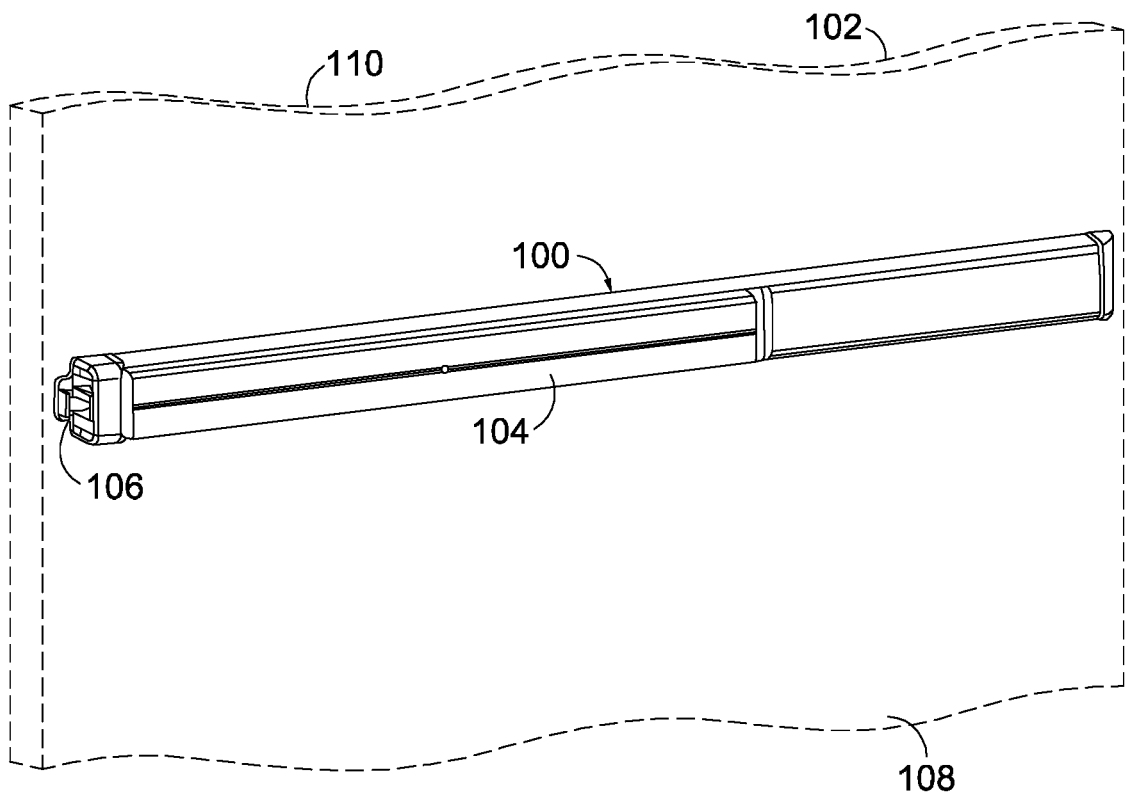
FIG. 1 is a perspective view of a prior art door latch system mounted onto a door.

Corresponding reference characters indicate corresponding parts throughout the several views. The exemplifications set out herein illustrate currently preferred embodiments of the present invention, and such exemplifications are not to be construed as limiting the scope of the invention in any manner.

DESCRIPTION OF THE PREFERRED EMBODIMENTS

Figure 2:
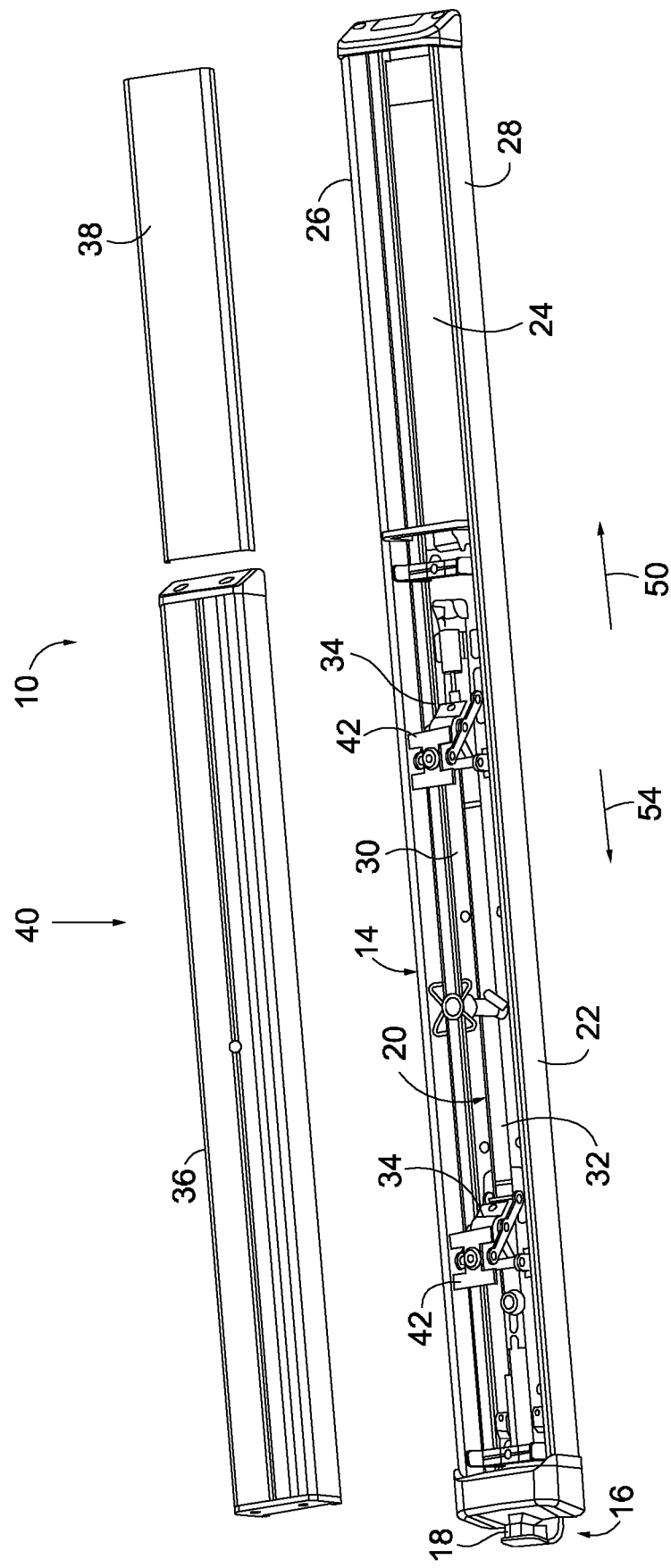
FIG. 2 is an exploded view of a door latch system in accordance with an aspect of the present invention.

Referring to FIG. 2, door latch mechanism 10 in accordance with the invention may be mounted onto a door (such as door 102, FIG. 1) and includes actuating assembly 14 and latch assembly 16 having a latch 18. A mating strike may be mounted on a door frame (not shown). Actuating assembly 14 includes actuating mechanism 20 which is mounted to housing 22. Housing 22 has a U-shaped cross section defined by a base plate 24 and opposing first and second sides 26, 28. Actuating mechanism 20 may include mounting bracket 30, a driving member 32, such as an actuating bar, movably connected to mounting bracket 30, at least one actuating member 34 and push bar 36. Actuating mechanism 20 may be actuable by push bar 36 secured within housing 22 which is mounted on the door (e.g., door 102). Cap 38 may be secured to housing 22 to cover any exposed internal components and present an aesthetically pleasing lock system (see also FIG. 1). Depression of push bar 36 into housing 22, such as in an actuating direction 40, causing distance A (FIG. 3) between the push bar 36 and base plate 24 to be reduced, moves driving member 32 to operate latch assembly 16 to disengage latch 18 from a corresponding strike which is secured in the door frame.

Figure 3:
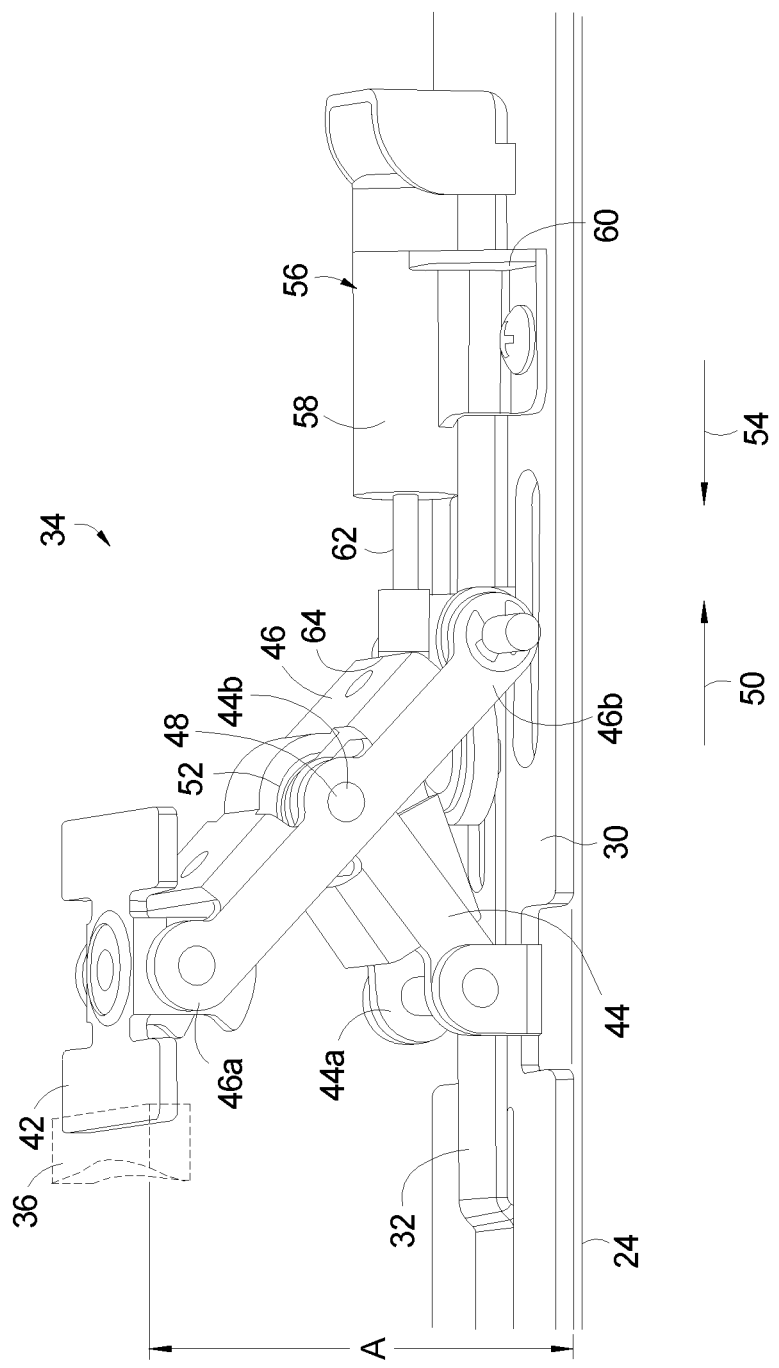
FIG. 3 is detailed view of a dashpot configured for use within the door latch system shown in FIG. 2.

With additional reference to FIG. 3, to facilitate depression of push bar 36 so as to direct latch 16 from the latched position to the unlatched position, push bar 36 may be coupled to at least one actuating member 34 by way of respective bar mounts 42 situated on each actuating member 34. In the example shown, each actuating member 34 may include a fixed leg 44 secured to mounting bracket 30 at a first end 44a and to a pivoting leg 46 at the opposing second end 44b via a pivot pin 48. Pivoting leg 46 may be pivotally coupled to bar mount 42 at a first end 46a and to driving member 32 at a second end 46b, wherein driving member 32 may be slidably coupled to mounting bracket 30 for linear movement. Mounting bracket 30 may be fixedly secured to the door (e.g., door 102) such that movement of push bar 36 in the actuating direction 40 through manual depression of push bar 36 causes driving member 32 to translate in the unlocking direction 50 and thereby causing latch 16 to withdraw from the strike. Each actuating member 34 may further include a biasing member 52 which may operate to urge driving member 32 in a restoring direction 54 to reverse direction of driving member 32 and return push bar 36 to the extended orientation whereby latch 16 is placed in the latched position so as to engage the strike and secure the door in the door frame.

With continued reference to FIG. 3, door latch mechanism 10 may further include a dashpot 56 to oppose movement of the push bar in actuating direction 40. As used herein, a dashpot is a viscous damping device. In accordance with an aspect of the present invention, dashpot 56 may be a pneumatic or hydraulic dashpot, although it should be understood by those skilled in the art that other suitable dashpots may be used.

Dashpot 56 resists motion via viscous friction. Inherent to its design, the resulting resistive force imposed by the dashpot through dashpot rod 62 is proportional to the velocity of the impacting force imposed on the dashpot through dashpot rod 62. The initial resistive or damping force of the dashpot may be varied, by design, by changing the viscosity of the dashpot's viscous material.

Figure 4:
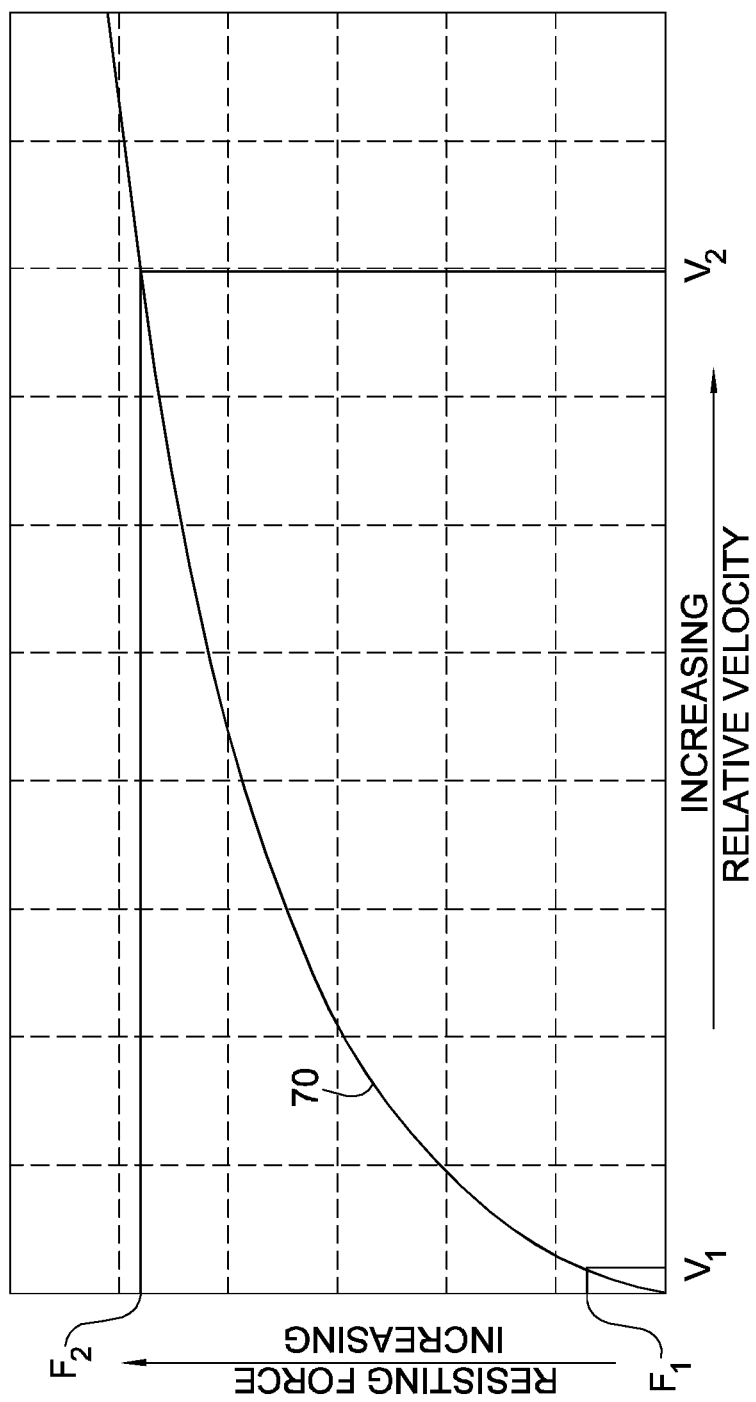
FIG. 4 depicts the relationship of the velocity of an impacting force applied to a dashpot to the resisting force imposed by the dashpot, in accordance with the invention.

Referring to FIG. 4, the inherent characteristic of a typical dashpot in accordance with the invention is shown (curve 70). When an impacting force at a relatively low velocity $V_1$ is applied to the dashpot, an almost negligible resistive force $F_1$ is imposed by the dashpot. However, when an impacting force at a relatively high velocity $V_2$ is applied to the same dashpot, a high resistive force $F_2$ is imposed by the dashpot.

Referring again to FIG. 3, dashpot 56 is configured to react to the force applied to it when the push bar is moved relative to mounting bracket 30. In the example shown, dashpot 56 includes a dashpot body 58 secured to the latch housing, such as via a mounting member 60. Dashpot rod 62, moves inward toward dashpot body 58 when a force is applied to it through actuating member 34, such as for example by driving member 32, when push bar 36 is moved toward base plate 24 in direction 40, so as to reduce distance A between push bar 36 and base plate 24.

In the example shown, terminal end 64 of rod 62 is positioned adjacent to pivoting leg 46 of actuating member 34 so as to oppose movement of driving member 32 when distance A is reduced. Terminal end 64 may abut directly against pivoting leg 46 or may be placed a slight distance (less than about ⅛ inch) away from pivoting leg 46. For those latch systems which include more than one actuating member 34 (such as door latch mechanism 10 shown in FIG. 2), dashpot 56 may be located adjacent any actuating member 34, but in accordance with one aspect of the present invention, is located adjacent the actuating member furthest from latch assembly 16.

It should be noted that terminal end 64 of rod 62 may be situated to contact driving member 32 to oppose movement between push bar 36 and base plate 24, or any other component of door latch system 10 that moves when distance A is reduced.

Under normal operating conditions, rod 62 may reciprocally travel within dashpot body 58 upon manual depression and release of push bar 36 (e.g., application of 15 pounds or less of actuation force on the push bar). Under these normal operating conditions, the velocity of the impacting force applied to rod 62 is relatively low and the resisting force imposed by the dashpot against movement of the push bar is negligible (see FIG. 4, $F_1$). As a result, dashpot 56 adds a minimal force, if any, to the force imposed on the push bar by biasing member 52 under normal operating conditions, thereby allowing door latch system 10 to meet the UL specification of 15 pounds of actuating force to retract latch 18. However, when the door experiences a high velocity impact, such as when struck by a projectile during a hurricane or tornado, dashpot 56 resists the momentary displacement of the door and base plate 24 toward the resting push bar 36 and a subsequent unwanted actuation of latch mechanism 16. Latch 18 may then remain securely seated within its mating strike with the door in its latch condition.

It is understood that the design features contributing to the damping characteristics of dashpot 56, including the viscosity of the viscous material, may be readily selected to match the operating characteristics of an associated exit device (e.g., the mass of the moving components; the coefficient of friction between moving surfaces) so as to provide the resisting force necessary to oppose movement of the push bar toward the door under hurricane conditions yet allow movement of the push bar under normal operating conditions to meet UL Specifications.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A method of forming a door latch system configured to resist unwanted unlatching of a latch of an exit device under high wind conditions, wherein the exit device includes a housing mounted to an unsecured side of a door such that a user can unlatch and open the door via the exit device, wherein the latch is movable between a latched position and an unlatched position using a push bar for releasably securing the door in a door frame, and a driving member of an actuating assembly, wherein the driving member is movable between a driving member latched position and a driving member unlatched position, the method comprising the steps of:
   a) determining a resistive force needed at the driving member to oppose an unwanted movement of the push bar toward the housing when the door is struck on a secured side of the door with a projectile at a high velocity simulating or caused by high wind conditions, wherein the secured side is opposite the unsecured side of the door, and wherein the unwanted movement of the push bar is a distance of movement sufficient to cause to move the latch to the unlatched position;
   b) selecting a dashpot configured to be mounted within the housing of the exit device so that, when the dashpot is positioned within the housing of the exit device in a manner of configuration so as to oppose a resulting movement of the driving member, the selected dashpot:
      i) resists the resulting movement with a first opposing force when the door is struck on the secured side with the projectile at the high velocity simulating or caused by high wind conditions; and
      ii) opposes movement of the driving member with a second opposing force when the push bar is operated under normal operating conditions, wherein the second opposing force is lesser than the first opposing force and said second opposing force is insufficient to prevent the latch from being caused to move to the unlatched position; and
   c) positioning the dashpot within the housing of the exit device in the manner of configuration so as to oppose the resulting movement of the driving member.

* * * * *